United States Patent [19]

Takahashi et al.

[11] Patent Number: 5,065,060
[45] Date of Patent: Nov. 12, 1991

[54] FLYWHEEL TYPE ENERGY STORAGE APPARATUS

[75] Inventors: Isao Takahashi, Nagaoka; Kazuhiko Tanaka, Nagoya; Akinori Nishihiro, Nagoya; Takeshi Irino, Nagoya, all of Japan

[73] Assignee: Mitsubishi Denki Kabushiki Kaisha, Tokyo, Japan

[21] Appl. No.: 487,935

[22] Filed: Mar. 5, 1990

[30] Foreign Application Priority Data

Mar. 6, 1989 [JP] Japan .................................. 1-53569

[51] Int. Cl.⁵ ............................................. H02K 7/02
[52] U.S. Cl. .................................. 310/74; 310/67 R; 310/113; 74/572
[58] Field of Search .................... 310/74, 113, 90, 89, 310/261, 67 R; 74/572

[56] References Cited

U.S. PATENT DOCUMENTS

| | | | |
|---|---|---|---|
| 3,741,034 | 6/1973 | Post | 74/572 |
| 3,970,917 | 7/1976 | Diggs | 310/74 |
| 4,540,930 | 9/1985 | Siedband | 310/113 |
| 4,629,947 | 12/1986 | Hammerslag | 310/74 |
| 4,870,310 | 9/1989 | Triplett | 310/74 |

FOREIGN PATENT DOCUMENTS 55-147930  11/1980  Japan .................................. 310/74

Primary Examiner—Steven L. Stephan
Assistant Examiner—Matthew Nguyen
Attorney, Agent, or Firm—Burns, Doane, Swecker & Mathis

[57] ABSTRACT

A flywheel type energy storage apparatus for use in an uninterruptible power supply has an induction motor which serves as a generator/motor, in which a rotor (65) of the induction motor is constituted by incorporation of a rotor core (62) and a flywheel (64) with a rotor shaft (56) vertically born by a pivot bearing (55) and a magnetic bearing (67).

11 Claims, 2 Drawing Sheets

FLYWHEEL TYPE ENERGY STORAGE APPARATUS

BACKGROUND OF THE INVENTION

1. Field of the Invention

The present invention relates to an improvement in an uninterruptible power supply for preventing malfunction or stop of a computer by occurrence of momentary interruption, and especially relates to a flywheel type energy storage apparatus used in the uninterruptible power supply, for storing kinetic energy, so that the kinetic energy is converted to electric energy for supply for a computer when the momentary interruption occurs.

2. Description of the Prior Art

A flywheel type energy storage apparatus to be used in an uninterruptible power supply stores energy in the form of kinetic energy by converting the electric energy to kinetic energy of a revolving flywheel, which rotates at a high speed and re-converts the kinetic energy to electric energy for supplying electric power to a load in case of a necessity, such as occurrence of a momentary interruption.

A conventional flywheel type energy storage apparatus, for example, shown in Japanese Unexamined Patent Publication Sho 52-65804 is described referring to FIG. 2. In FIG. 2, a flywheel 2 is rotatably born in a vacuum cavity 1. The flywheel 2 is made of a magnetic material, formed in a disc shape and disposed in a manner that its axis is parallel to the force of gravity. Ring-shaped members 3a and 3b are formed to have their sections protruding upward and downward from the upper and the lower faces of the disc. The upper and the lower shaft members 4a and 4b are fixed coaxially to the centers of the upper and the lower faces of the flywheel 2. The lower end of the lower shaft member 4b is born by a spherical bearing 5 fixed on the bottom of the vacuum chamber 1.

Furthermore, a magnetic bearing 6 is provided in the vicinity of the ring-shaped members 3a and 3b. The magnetic bearing 6 comprises a ring-shaped magnetic frame 7 which is disposed in a manner that pole faces 7a and 7b thereof face top and bottom faces of the ring-shaped members 3a and 3b with predetermined gap and a excitation coil 8 mounted in the magnetic frame 7. Hereupon, a gap P between the upper ring-shaped member 3a and the upper pole face 7a of the magnetic frame 7 is set to be narrower than a gap Q between the lower ring-shaped member 3b and the lower pole face 7b of the magnetic frame 7.

On the other hand, a rotor 10 of a main generator 9 which serves as a motor is fixed on outer periphery of the lower shaft member 4b. And a stator 11 of the main generator 9 is fixed a position to magnetically couple the rotor 10. Furthermore, a rotor 13 of sub-generator 12 is fixed to the upper shaft member 4a, and a stator 14 of the sub-generator 12 is fixed at a position to magnetically couple the rotor 13.

Lead wires of windings of the rotors 10, 13 and the stators 11, 14 of the generators 9 and 12 and the excitation coil 8 of the magnetic bearing 6 are led out of the vacuum chamber 1 through airtight sealings. Interior of the vacuum chamber 1 is maintained in sufficiently low pressure.

The excitation coil 8 of the magnetic bearing 6 is normally excited. When the excitation coil 8 is excited, magnetic flux induced by the excitation coil 8 passes a closed magnetic circuit connecting of the magnetic frame 7 and the ring-shaped members 3a and 3b. Therefore, thrust magnetic attraction occurs between the pole faces of the magnetic frame 7 and the ring-shaped members 3a and 3b. As a result, thrust load of the flywheel 2 is created.

Since the gap P is set to be narrower than the gap Q, a magnetic attraction force in an upward direction in FIG. 2 acts on the flywheel 2. Accordingly, a thrust load actually applied on the spherical bearing 5 becomes only a fraction of weight of the flywheel.

In the above-mentioned conventional flywheel type energy storage apparatus, the main generator 9 is driven as a motor, and the flywheel starts to rotate by electrification of the excitation coil 8. When the rotation speed of the flywheel 2 reaches a predetermined value, the main generator 9 is switched to a generator. At that time, kinetic energy stored in the flywheel 2 is converted to electric energy and returned to the power line as electric power.

Generally, the amount of the kinetic energy stored in the flywheel is determined by the amount of inertia of the flywheel and the rotation speed thereof. Accordingly, it is necessary to increase the moment of inertia of the flywheel and the rotation speed thereof for increasing the amount of the kinetic energy stored in the flywheel.

In the conventional flywheel type energy storage apparatus shown in FIG. 2, the ring-shaped members 3a and 3b are formed integrally on peripheral parts of the front and rear faces of the flywheel 2. In such configuration, it is impossible to obtain sufficiently high strength to withstand a very high rotation speed of the flywheel 2, which is suitable to store a large amount of kinetic energy, since a very large moment of the inertia of the flywheel is made by centrifugal force in the high speed rotation. Accordingly, it has been necessary to increase the diameter of the flywheel 2 or to make the ring-shaped members 3a and 3b very thick in the axial direction of the flywheel 2, to increase the amount of the kinetic energy stored in the flywheel 2. As a result, the conventional flywheel type energy storage apparatus has a disadvantage that the apparatus becomes very large and very heavy in order to store a large amount of kinetic energy.

SUMMARY OF THE INVENTION

The purpose of the present invention is to provide an improved flywheel type energy storage apparatus, in which a flywheel can be rotated at a very high rotation speed without undue increase of its size and weight.

A flywheel type energy storage apparatus in accordance with the present invention for storing electric energy converted into kinetic energy of high speed rotation by an induction motor and for outputting electric energy converted from said kinetic energy by a generator for supplying it to an electric load, in case of necessity, wherein:

said induction motor and said generator are constituted as an induction generator/motor.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
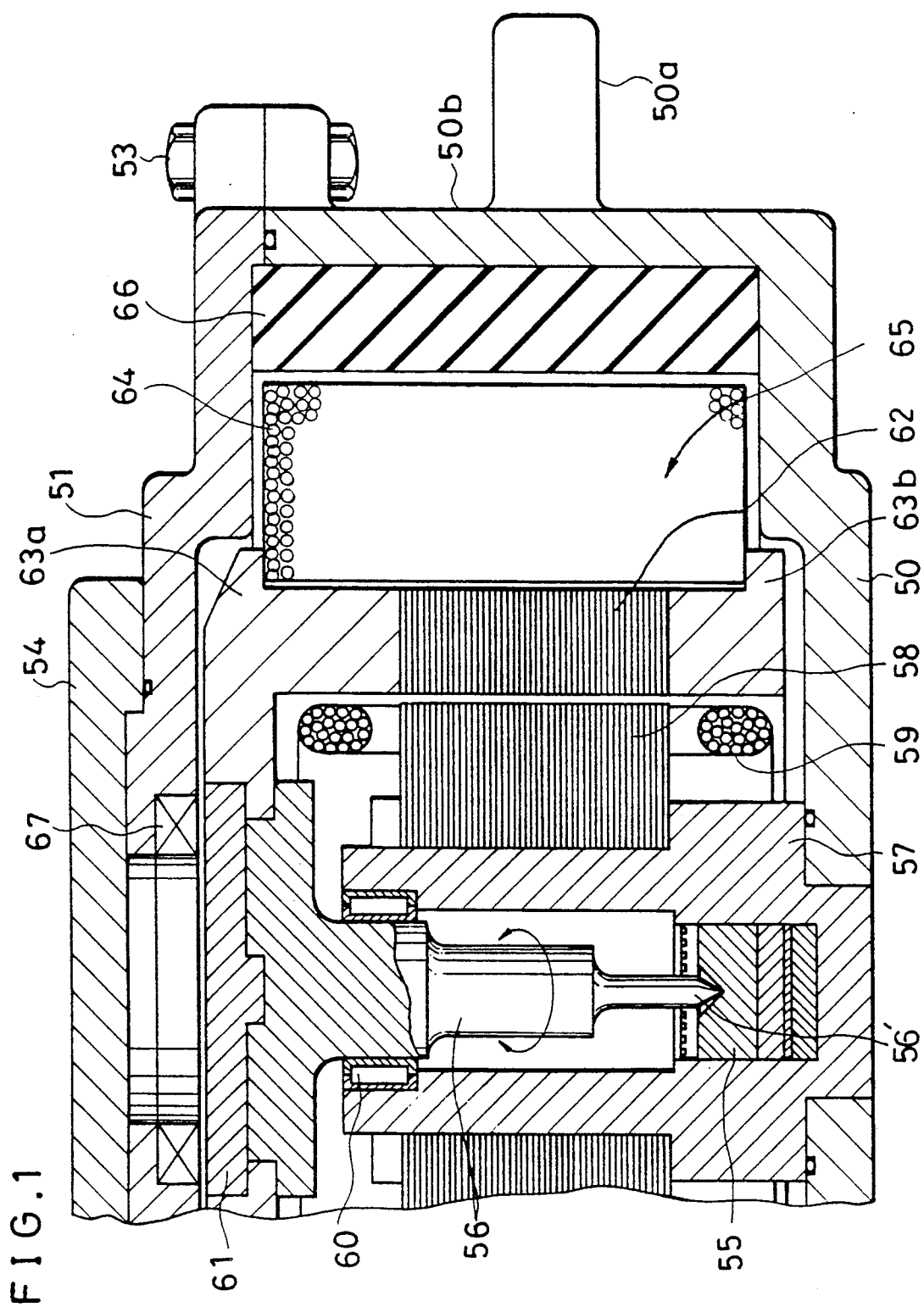
FIG. 1 is a cross-sectional side view showing a preferred embodiment of a flywheel type energy storage apparatus in accordance with the present invention.
Figure 2:
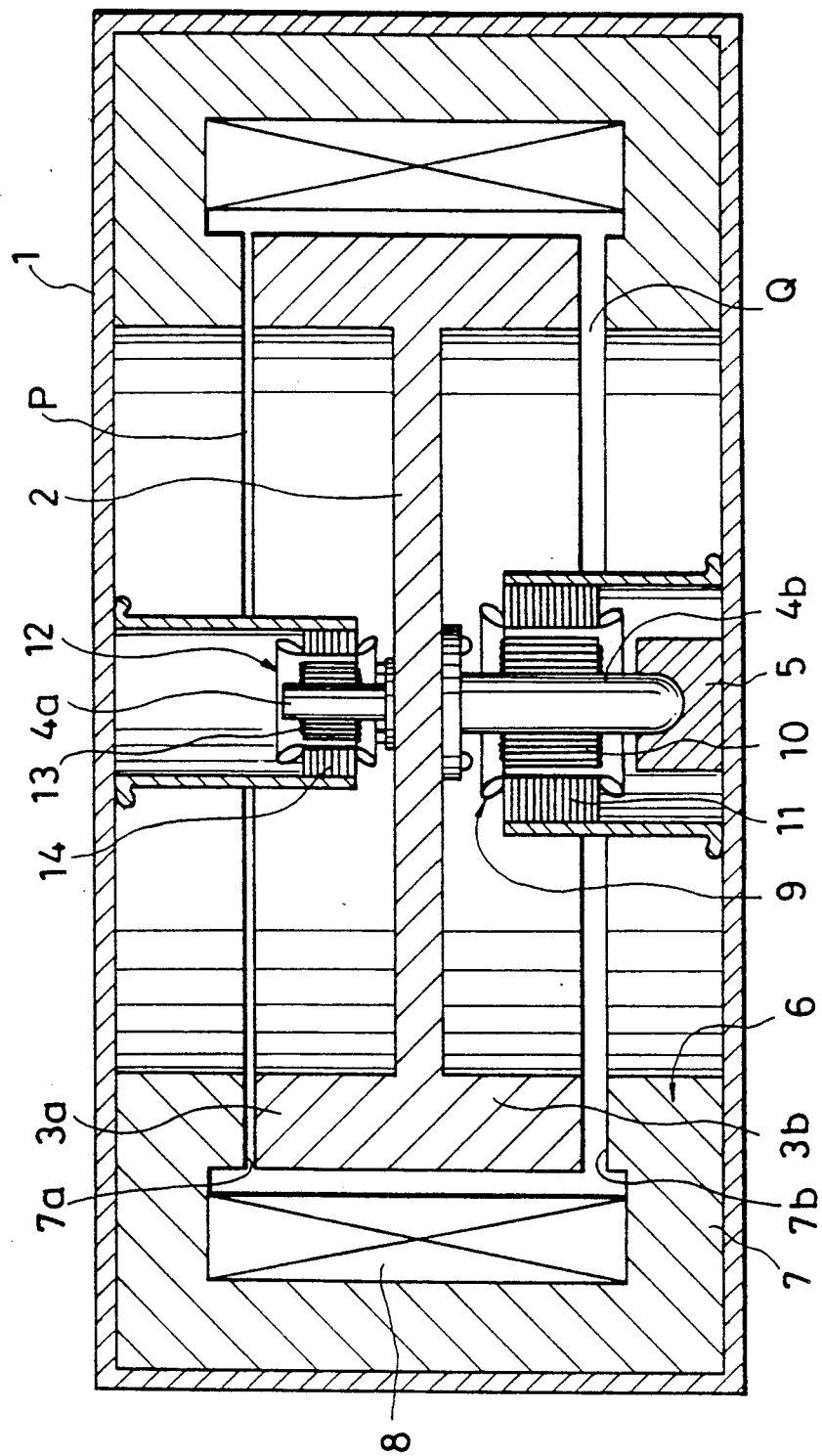
FIG. 2 is a cross-sectional side view showing a conventional flywheel type energy storage apparatus.

FIG. 1 is a cross-sectional side view showing a preferred embodiment of a flywheel type energy storage apparatus in accordance with the preferred embodiment. In FIG. 1, a vacuum container 50 has a fixing part 50a on outer periphery of a cylindrical face 50b. A cover 51 is fixed on the vacuum container 50 by bolt 53. A top cap 54 is also fixed on the cover 51 by bolts (not shown in the figure). The lower end 56' of a shaft 56 is tapered and the tapered lower end 56' of the shaft 56 is rotatably and pivotally born by a pivot bearing 55. When the shaft 56 rotates at a high rotation speed, a high pressure is generated in lubricant oil by pumping effect of the rotation, and the shaft 56 is floated thereon in a manner not to contact with the surface of the pivot bearing 55.

A stator frame 57 is fixed on the vacuum container 50. A stator core 58 is made of multiple lamination of thin ferromagnetic metal sheets such as galvanized sheet iron, and a coil 59 is wound thereon. A needle bearing 60 for restraining the deflection of the shaft 56 is mounted on the stator frame 57. A connector 61 made of metal is fixed on another end of the shaft 56.

A rotor core 62 made of multiple lamination of ring-shaped ferromagnetic metal sheets such as galvanized sheet iron. The ring-shaped metal sheets of the rotor core 62 have many notches on their inner periphery and the notches of respective metal sheets, and brought in lines to form slots of the rotor core 62. Known conductor rods (not shown) of a conductive material, such as aluminum, are filled in the slots of the rotor core 62 and both ends of the filled conductive rods are short-circuited by end rings 63a and 63b, at both ends of the rotor core 62. The upper end ring 63a is fixed to and over the shaft 56 by the connector 61 in a manner that the rotor core 62 faces to the stator core 58 with a predetermined gap. A flywheel 64 is held by the end rings 63a and 63b, and is made of circular winding of piano wires in a large number of turns substantial in coaxial disposition with the shaft 56, and firmly fixed by known cement e.g. epoxy resin.

In combination with the shaft 56, the connector 61, the rotor 62, the end rings 63a and 63b, the flywheel 64 and a ring-shaped rotor 65 arranged cocentric around the shaft 56 are constructed. Furthermore, the stator core 58, the coil 59, the rotor core 62 and the end rings 63a and 63b are assembled. The above-mentioned components together assembled constitute an induction motor for serving as generator/motor.

A protector 66 for protecting the apparatus from an accidental break of the flywheel 64 is fixed on the inner face of the vacuum container 50. A permanent magnet 67 is fixed on the cover 51 at a position to face the connector 61 with a predetermined gap in-between. By the attraction force between the magnet 67 and the connector 61, rotation balance of the rotor 65 is maintained.

In the above-mentioned flywheel type energy storage apparatus in accordance with the present invention, when electric power is supplied from exterior of the apparatus to the coil 59 on the stator core 58, magnetic induction is generated between the stator core 58 and the rotor core 62, and thereby the rotor 65 rotates around the shaft 56 in high rotation speed. The flywheel 64 having a considerable moment of inertia and rotating in high speed has an energy corresponding to the amount supplied from the exterior in the form of kinetic energy, and the stored kinetic energy is re-converted to the electric energy (A.C. current) and supplied to the outside electric load in the form of electric power in case of necessity, by known control art.

In the above-mentioned embodiment, the winding of the piano wire is used as the flywheel 64. But, as other embodiment, high tensile fibers, such as reinforced fibers of glass fiber or carbon fiber or high tensile steel, can be used as fan as the flywheel has a desired mass.

Since the induction motor is used as the generator/motor, core loss to be generated in its primary core can be suppressed by reducing the input voltage to the induction motor as low as possible in idling state i.e. steady state, when only little driving force is necessary. Thereby, efficiency of the induction motor is much improved without any cooling means.

Still more, the rotor 65 of the induction motor is well reinforced against the centrifugal force, and is fixed on the vertical shaft 56, and the rotor core 62 and the flywheel 64 are made in one unit on the shaft 56. Therefore, it is possible to rotate the rotor 65 in a higher rotation than the conventional one. Therefore, very large amount of kinetic energy can be stored in the flywheel without undue increase of size and weight of the flywheel.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An energy storage apparatus for storing electrical energy as rotational kinetic energy and for outputting said kinetic energy as electrical energy, comprising:
   a vacuum container; and
   an induction motor/generator contained in said vacuum container, said induction motor/generator including
   a rotor,
   a stator, and
   a flywheel rotatably supported in said vacuum container by a shaft,
   said flywheel including a circular winding of wire having a large number of turns which is substantially coaxial with said shaft and which is wound around said rotor.

2. An energy storage apparatus as claimed in claim 1, wherein said shaft is a rotatable shaft fixed to said flywheel for rotation therewith, and wherein said shaft extends within said stator and said rotor extends around said stator.

3. An energy storage apparatus as claimed in claim 1, wherein said induction motor/generator further includes a needle bearing disposed around said shaft, a pivot bearing disposed beneath said shaft, and a magnet disposed above said flywheel, said needle bearing, said pivot bearing, and said magnet cooperating to maintain a rotational balance of said flywheel.

4. An energy storage apparatus as claimed in claim 3, wherein said pivot bearing includes a lubricant oil, a high pressure being generated in said lubricant oil when said shaft rotates, such that said shaft floats on a surface of said lubricant oil when said shaft rotates.

5. An energy storage apparatus for storing electrical energy as rotational kinetic energy and for outputting said kinetic energy as electrical energy, comprising:
   a vacuum container; and an induction motor/generator contained in said vacuum container, said induction motor/generator including
      a flywheel rotatably supported in said vacuum container by a rotatable shaft, said flywheel including a circular winding of wire having a large number of turns which is substantially coaxial with said shaft,
      a rotor mounted on said flywheel, said rotor including a multiple lamination of ring-shaped ferromagnetic metal sheets, and a stator.

6. An energy storage apparatus for storing electrical energy as rotational kinetic energy and for outputting said kinetic energy as electrical energy, comprising:
   a vacuum container; and
   an induction motor/generator contained in said vacuum container, said induction motor/generator including
      a flywheel rotatably supported in said vacuum container by a rotatable shaft, said flywheel including a circular winding of wire having a large number of turns which is substantially coaxial with said shaft,
      a rotor mounted on said flywheel, and
      a stator, wherein said stator includes a multiple lamination of thin ferromagnetic metal sheets having a coil wound thereon.

7. An energy storage apparatus for storing electrical energy as rotational kinetic energy and for outputting said kinetic energy as electrical energy, comprising:
   a vacuum container; and
   an induction motor/generator contained in said vacuum container, said induction motor/generator including:
      a flywheel rotatably supported in said vacuum container by a rotatable shaft which is fixed to said flywheel for rotation therewith,
      a rotor mounted on said flywheel, and
      a stator, said rotatable shaft extending within said stator, and said rotor extending around said stator.

8. An energy storage apparatus as claimed in claim 7, wherein said stator includes a multiple lamination of thin ferromagnetic metal sheets having a coil wound thereon.

9. An energy storage apparatus as claimed in claim 7, wherein said rotor includes a multiple lamination of ring-shaped ferromagnetic metal sheets.

10. An energy storage apparatus as claimed in claim 7, wherein said induction motor/generator further includes a needle bearing disposed around said shaft, a pivot bearing disposed beneath said shaft, and a magnet disposed above said flywheel, said needle bearing, said pivot bearing, and said magnet cooperating to maintain a rotational balance of said flywheel.

11. An energy storage apparatus as claimed in claim 10, wherein said pivot bearing includes a lubricant oil, a high pressure being generated in said lubricant oil when said shaft rotates, such that said shaft floats on a surface of said lubricant oil when said shaft rotates.

* * * * *